C. OSNER.
CAKE TURNER.
APPLICATION FILED NOV. 14, 1910.
996,123.
Patented June 27, 1911.
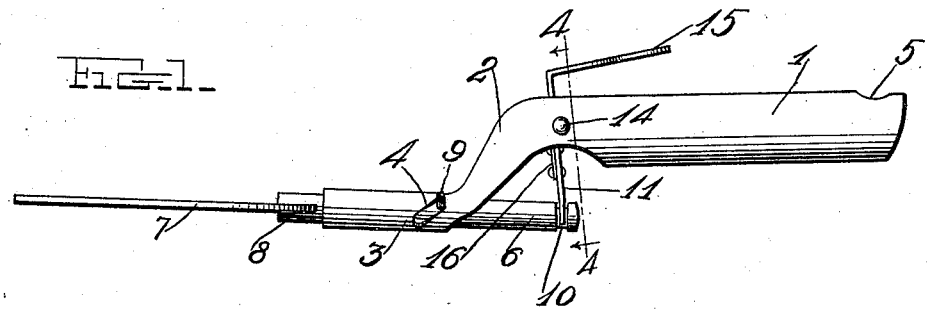
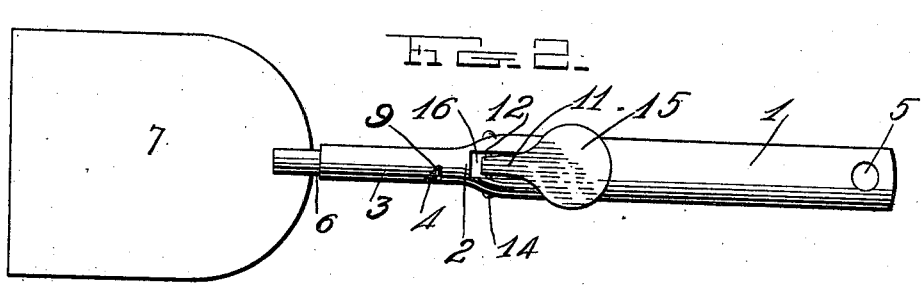
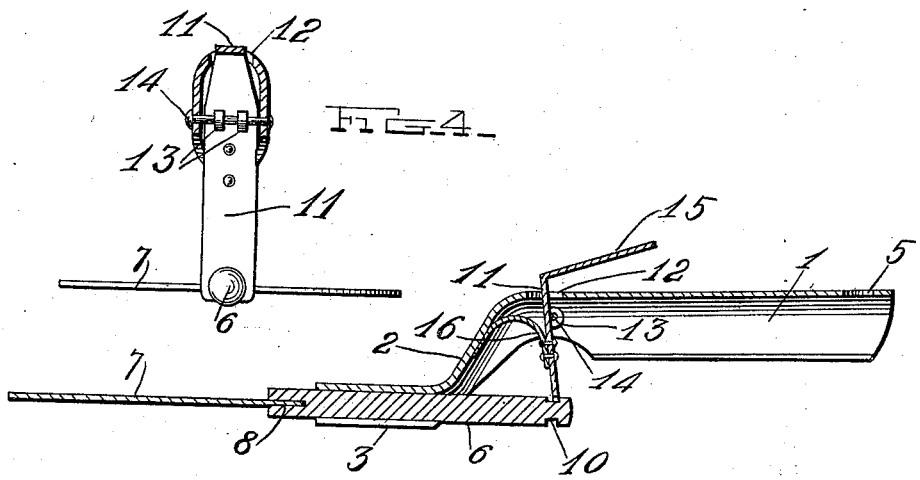
Witnesses
J. R. Pierce
O. B. Hopkins
Inventor
Chas. Osner
by H. B. Willson & Co.
Attorneys

UNITED STATES PATENT OFFICE.

CHARLES OSNER, OF MIDDLETOWN, OHIO.

CAKE-TURNER.

996,123. Specification of Letters Patent. Patented June 27, 1911.

Application filed November 14, 1910. Serial No. 592,288.

*To all whom it may concern:*

Be it known that I, CHARLES OSNER, a citizen of the United States, residing at Middletown, in the county of Butler and State of Ohio, have invented certain new and useful Improvements in Cake-Turners; and I do declare the following to be a full, clear, and exact description of the invention, such as will enable others skilled in the art to which it appertains to make and use the same.

This invention relates to improvements in cake turners.

One object of the invention is to provide a cake turner having means for oscillating the blade for the purpose of facilitating the turning of the cakes or other articles with which the blade is engaged.

Another object is to provide a cake turner of this character which will be simple, strong, durable, and inexpensive in construction, and well adapted to the purpose for which it is designed.

With these and other objects in view, the invention consists of certain novel features of construction, combination and arrangement of parts as will be more fully described and particularly pointed out in the appended claims.

In the accompanying drawings:—Figure 1 is a side view of a cake turner constructed in accordance with the invention; Fig. 2 is a top plan view thereof; Fig. 3 is a vertical longitudinal sectional view; and Fig. 4 is a vertical cross sectional view on the line 4—4 of Fig. 1.

My improved cake turner comprises a handle 1 which may be of any suitable construction and is here shown as being constructed in the form of a sheet metal tube. The inner end of the handle is bent downwardly and thence forwardly, as shown at 2, and on the front end of the handle is formed a tubular bearing sleeve 3. In the tubular bearing sleeve is formed an oblique slot 4, the purpose of which will be hereinafter described. In the outer end of the handle is preferably formed an aperture 5, by means of which the turner may be hung upon a nail or other support when not in use.

In the tubular bearing sleeve 3 is loosely mounted the shank 6 of a turning blade 7. The blade 7 may be of any suitable shape and is here shown as being formed of sheet metal and seamed at its inner end in a notch 8 formed in the outer end of the shank 6. The blade, however, may, if desired, be formed integral with the shank. Secured to the shank 6, is a laterally projecting blade operating pin 9 which engages and projects through the slot 4 of the sleeve 3 of the handle.

In the shank 6 adjacent to its outer end is formed an annular groove 10 with which is engaged the bifurcated lower end of a handle operating lever 11, the upper end of which is reduced and projects through an opening 12 formed in the top of the handle adjacent to its inner end, as shown. On the upper portion of the lever 11 are formed bearing lugs 13, said lugs being preferably struck from the metal forming the lever and bent out to form eyes or loops with which is engaged a pivot pin 14 which is arranged through the handle adjacent to the upper end of the lever, as shown. The reduced upper end of the lever 11 after passing through the opening 12 is bent back at substantially right angles to the lever and lies above the middle portion of the handle, as shown. The upper end of the lever is enlarged to form a thumb plate or handle 15 which when depressed will rock the lever on the pivot pin 14, thus causing the lower end of the lever to project the shank 6 of the plate forwardly through the sleeve 3. This forward movement of the shank 6 causes the pin 9 to travel through the slot 4, which movement causes the shank to turn or oscillate in the sleeve thus oscillating the blade and turning the cake or other object with which the blade is engaged.

Secured to the forward or inner side of the lever 11 is a retracting spring 16 which may be of any suitable construction and is here shown in the form of a curved leaf spring, the forward end of which engages the inner side of the downwardly bent portion 2 of the handle. When thus arranged, the pressure of the spring will be exerted to swing the lower end of the lever back after the upper end has been released, thus restoring the blade to its normal position.

From the foregoing description, taken in connection with the accompanying drawings, the construction and operation of the invention will be readily understood without requiring a more extended explanation.

Having thus described my invention, what I claim is:—

1. A cake turner comprising a handle, a tubular bearing sleeve formed on the inner end of said handle, said sleeve having formed therein a slot, a shank loosely mounted in said sleeve, a pin arranged in said shank and adapted to operatively engage said slot whereby when the shank is projected and retracted in the sleeve said shank will be oscillated, a blade arranged on the outer end of the shank, and a lever pivotally mounted in said handle and having an operative engagement with the inner end of the shank whereby the latter is projected and retracted in said sleeve.

2. A cake turner comprising a handle, a tubular bearing sleeve formed on the inner end of said handle, said sleeve having formed therein a slot, a shank loosely mounted in said sleeve, a pin arranged in said shank and adapted to operatively engage said slot whereby when the shank is projected and retracted in the sleeve said shank will be oscillated, a blade arranged on the outer end of the shank, an operating lever pivotally mounted in the handle, said lever having an operative engagement with one end of the shank, a handle formed on the upper end of said lever whereby the latter is rotated in one direction to project the shank through the sleeve, and a spring adapted to rock said lever in the opposite direction whereby said shank is retracted in the sleeve, said projecting and retracting movements causing the shank and blade to be oscillated by the engagement of the pin in said shank with the slot in said sleeve.

In testimony whereof I have hereunto set my hand in presence of two subscribing witnesses.

CHARLES OSNER.

Witnesses:
JOHN H. KEMP,
JOHN F. RUSH.

---

Copies of this patent may be obtained for five cents each, by addressing the "Commissioner of Patents, Washington, D. C."